United States Patent [19]

Taylor

[11] 4,265,344
[45] May 5, 1981

[54] LIQUID SPRING WITH INTEGRAL PLASTIC BODY AND SEAL AND FABRICATION METHOD THEREFOR

[75] Inventor: Paul H. Taylor, Grand Island, N.Y.

[73] Assignee: Tayco Developments, Inc., North Tonawanda, N.Y.

[21] Appl. No.: 76,839

[22] Filed: Sep. 19, 1979

Related U.S. Application Data

[63] Continuation of Ser. No. 862,745, Dec. 21, 1977, abandoned.

[51] Int. Cl.³ .............................................. F16F 9/32
[52] U.S. Cl. ................................................ 188/322
[58] Field of Search ............... 188/268, 285, 288, 297, 188/311, 313, 316, 317, 322

[56] References Cited

U.S. PATENT DOCUMENTS

| 2,664,764 | 1/1954 | Blackburn | 188/268 X |
| 3,343,833 | 9/1967 | Fader | 188/322 X |
| 4,064,977 | 12/1977 | Taylor | 188/268 X |

FOREIGN PATENT DOCUMENTS 2052774  7/1971  Fed. Rep. of Germany ........... 188/285

Primary Examiner—Duane A. Reger
Attorney, Agent, or Firm—Joseph P. Gastel

[57] ABSTRACT

A liquid shock absorber device including a plastic cylinder having first and second ends, a piston rod having a first end within the cylinder and a second end externally of the cylinder, a plastic seal formed integrally with the cylinder at the first end and defining an opening for receiving the piston rod in sealing relationship, a closure for closing the second end of the cylinder, and fluid in the cylinder. The closure on the second end may have a piston associated therewith for preloading the fluid.

16 Claims, 12 Drawing Figures

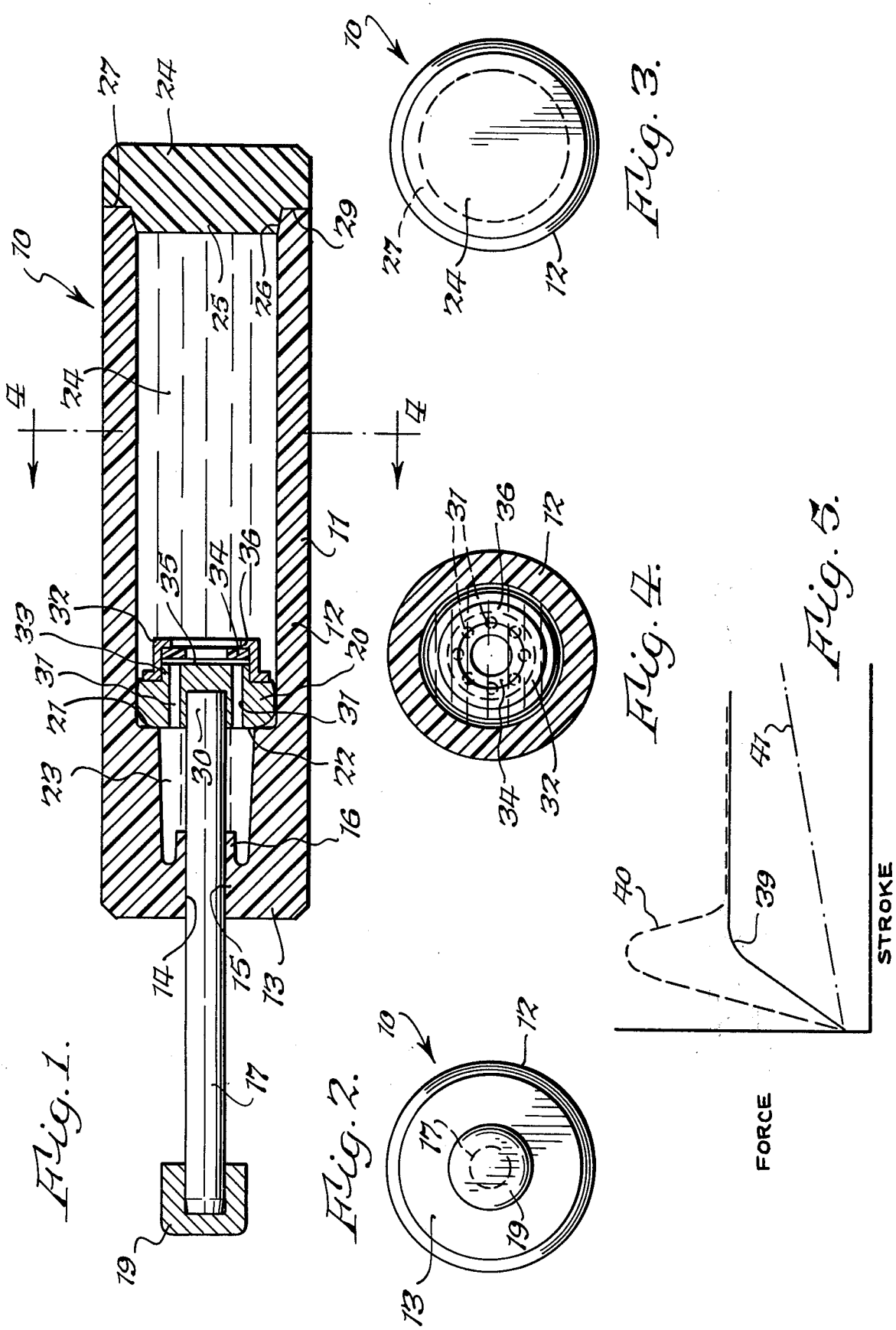

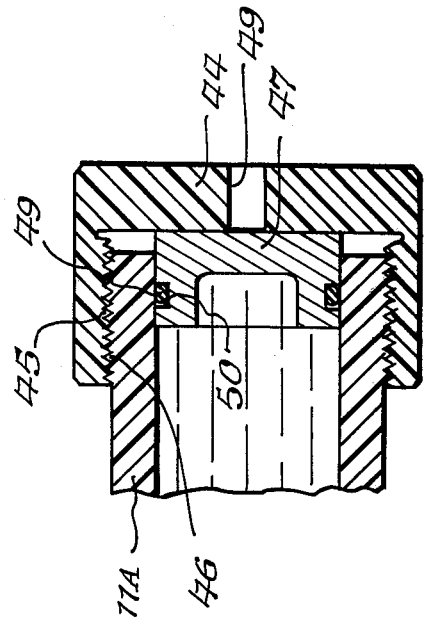
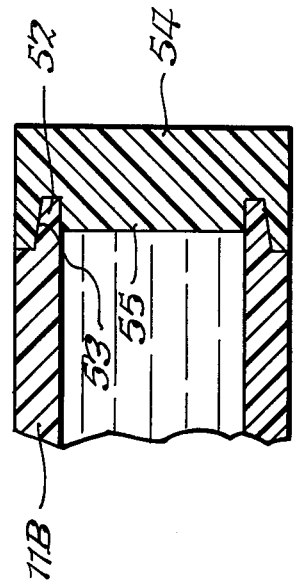
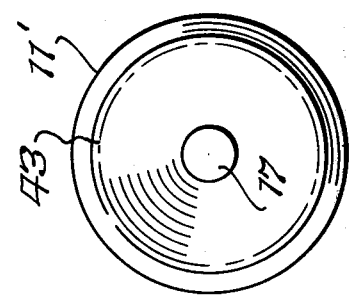
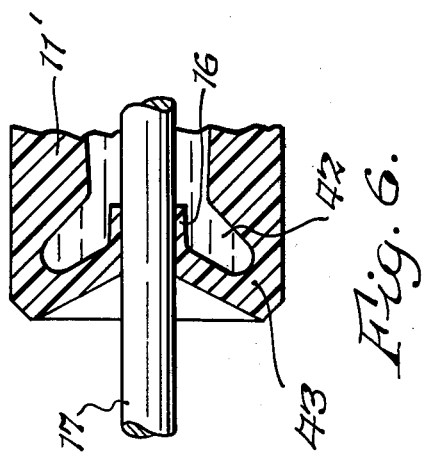
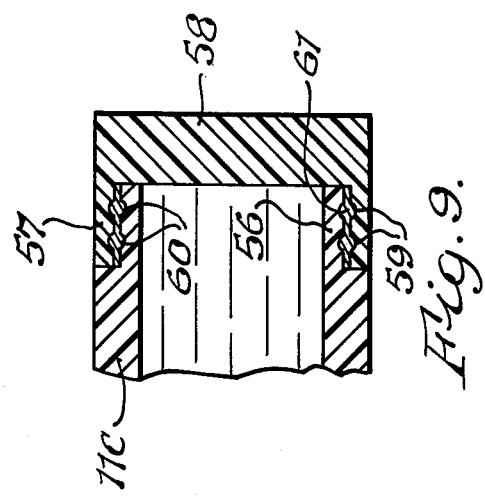

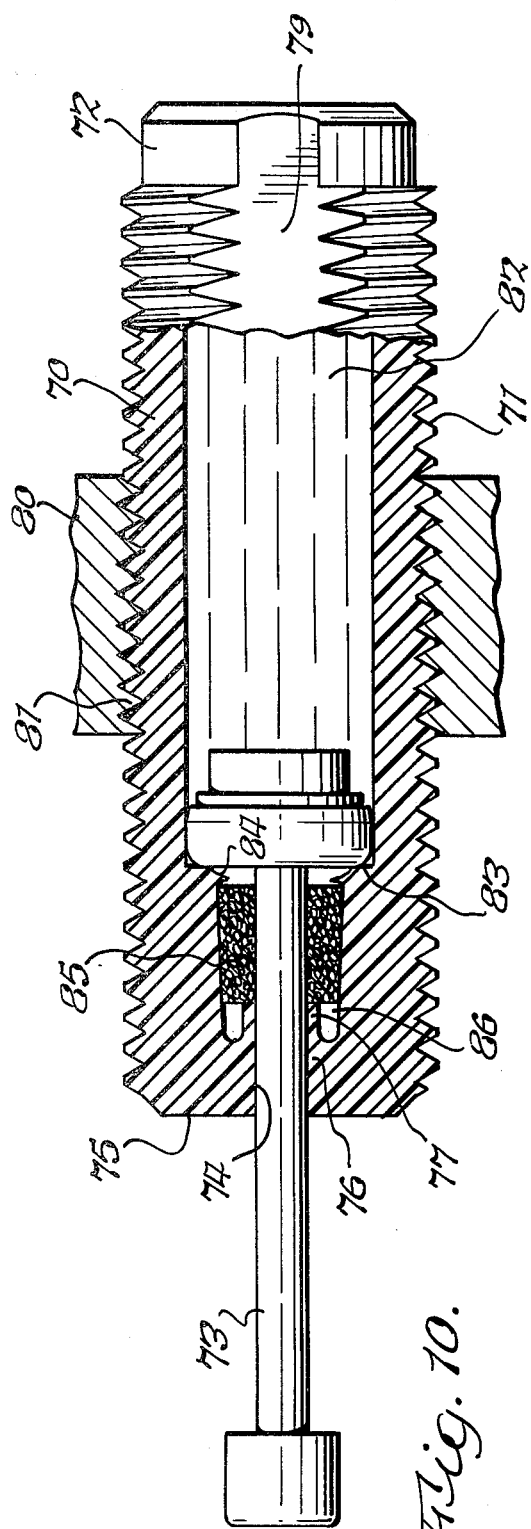
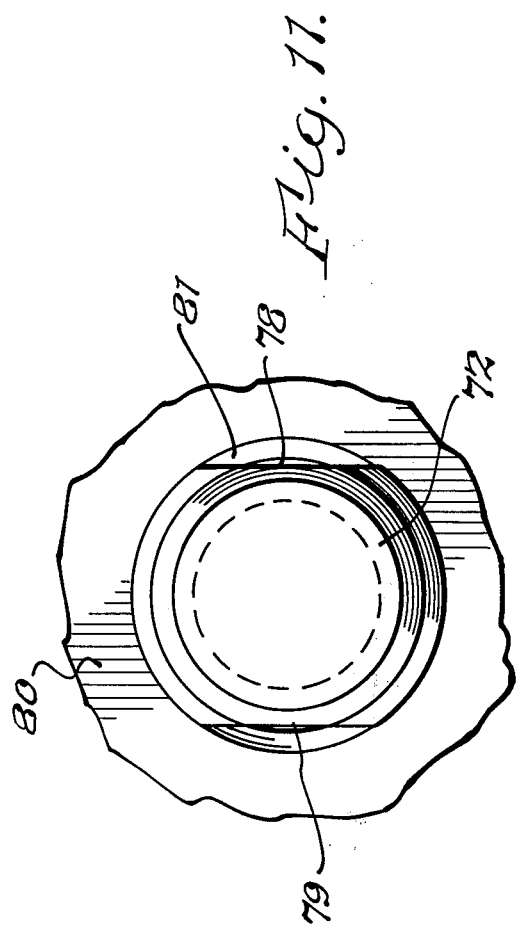

LIQUID SPRING WITH INTEGRAL PLASTIC BODY AND SEAL AND FABRICATION METHOD THEREFOR

This is a continuation of application Ser. No. 862,745 filed on Dec. 21, 1977, now abandoned.

BACKGROUND OF THE INVENTION

The present invention relates to improved liquid shock absorber devices, including liquid spring devices and conventional shock absorbers and to a method of fabrication thereof at low cost.

By way of background, prior shock absorber devices including shock absorbers and liquid springs were fabricated from a separate housing and a separate piston rod seal which had to be assembled, thereby increasing the complexity of the device as well as the cost thereof. In the past it apparently was not considered logical to form an integral housing and seal in a liquid spring device or shock absorber because of the fact that a structure which was sufficiently flexible to produce a seal was too flexible for the remainder of the housing, and, conversely, a structure which was sufficiently rigid to provide a suitable housing, was too rigid to provide a satisfactory seal. Thus, prior liquid shock absorber devices were therefore assembled units having a separate cylinder and piston rod seal, and this increased their cost.

SUMMARY OF THE INVENTION

It is accordingly the object of the present invention to provide a low cost liquid spring or shock absorber which includes an integral cylinder and seal structure and which is made of plastic material which is sufficiently rigid to provide the necessary strength to the cylinder and yet is sufficiently flexible to provide a commercially acceptable seal.

It is another object of the present invention to provide an improved low cost liquid spring device in which the compressible fluid is preloaded in an extremely expedient low cost manner.

Yet another object of the present invention is to provide an improved method for fabricating a liquid spring or shock absorber which is extremely low cost in that all parts, exclusive of the piston assembly, consist of an integral cylinder-seal unit and a separate end cap therefor. Other objects and attendant advantages of the present invention will readily be perceived hereafter.

The present invention relates to a liquid shock absorber device comprising a plastic cylinder having first and second ends with a central portion therebetween, a piston rod having a first end within said cylinder and a second end externally of said cylinder, a plastic seal formed integrally with said cylinder at said first end and defining an opening for receiving said piston rod in sealing relationship, closure means closing said second end of said cylinder, and fluid in said cylinder. In its more specific aspects, the liquid shock absorber device includes compression means for placing the compressible fluid under compression and it also may include a shoulder within the cylinder for abutting the piston head to divide the shock absorber into first and second chambers.

The present invention also relates to a method of fabricating a shock absorber device comprising the steps of fabricating a cylinder having first and second ends with an opening in said first end and a seal integral with said cylinder surrounding said opening, inserting a piston rod through said opening in sealing engagement with said seal, filling said cylinder with fluid and mounting an end cap on said second end of said cylinder to confine said fluid therein. In its more specific aspects, where the fluid is compressible, the method includes the step of compressing the compressible fluid to preload the shock absorber device, and preferably the step of compressing the fluid is performed incidental to mounting the end cap on the second end.

The present invention is directed to liquid shock absorber devices which include liquid springs utilizing a compressible fluid and also to shock absorbers which utilize an incompressible fluid, and while the description is directed to a liquid spring device, it will be appreciated that the terminology "liquid shock absorber device" in the claims encompasses both liquid springs and conventional shock absorbers. The various aspects of the present invention will be more fully understood when the following portions of the specification are read in conjunction with the accompanying drawings wherein:

BRIEF DESCRIPTION OF THE DRAWINGS

FIG. 1 is a cross sectional view of the improved liquid spring of the present invention;

FIG. 2 is an end elevational view taken from the left of FIG. 1;

FIG. 3 is an end elevational view taken from the right of FIG. 1;

FIG. 4 is a cross sectional view taken substantially along line 4—4 of FIG. 1;

FIG. 5 is a force-stroke curve for the liquid spring of FIG. 1;

FIG. 6 is a fragmentary cross sectional view similar to a portion of FIG. 1 but showing a construction for hinging the end wall of the cylinder to improve sealing;

FIG. 6A is an end elevational view taken from the left of FIG. 6;

FIG. 7 is a fragmentary cross sectional view of a modified form of cylinder end construction;

FIG. 8 is a fragmentary cross sectional view of still another form of end wall construction;

FIG. 9 is a fragmentary cross sectional view of yet a further type of end wall construction;

FIG. 10 is a view, partially in cross section showing a further modified liquid spring construction; and FIG. 11 is an end elevational view taken from the right of FIG. 10.

DESCRIPTION OF THE PREFERRED EMBODIMENTS

The improved liquid spring 10 of FIG. 1 includes a cylinder 11 having a central body portion 12 having formed integrally therewith at one end an end wall 13 including a piston receiving aperture 14 therein bounded by seal 15 which extends throughout the length of the aperture and terminates at annular flexible lip portion 16. Because the seal 15, end wall 13 and central body portion 12 are molded integrally as a unit, the cost of the liquid spring 10 is reduced considerably over prior construction containing a separate seal and cylinder.

A piston rod 17 extends through opening 14 with an interference fit to provide good sealing with seal 15. Piston rod 17 is of relatively small diameter to provide a low spring restoring force and so that its displacement is minimal. Since it is a critical column, it is made of high strength steel. A metal cap 19 is mounted on the end of piston rod 17 to receive impacts from a foreign body. A portion of piston rod 17 is located within cylinder 11 and this portion mounts at the end thereof a piston head 20. An annular shoulder 21 is formed integrally with body portion 12 and serves as an abutment for side 22 of piston head 20. Annular shoulder 21 is the boundary line between chamber 23 to the left of shoulder 21 and chamber 24 to the right of shoulder 21. Chambers 23 and 24 contain compressible liquid, preferably silicone fluid such as Dow Corning 210. The fluid is preloaded to a predetermined pressure by the process of assembling end cap 24 onto the open end of cylinder 11. In this respect, end cap 24 includes a piston portion 25 which fits into opening 26 with a tight fit. The process of moving end cap 24 to the left until the end 27 of body portion 12 is abutted by annular shoulder 29 of cap 24 causes a compression of the fluid in chambers 23 and 24 to thereby preload the liquid spring 10. The amount of preloading is determined by the length of piston 25, as compared to the total volume of liquid within the cylinder 11. After cap 24 has been moved to its final position, it is spun or friction welded to cylinder 12, or it can be ultrasonically welded or it can be secured by means of a suitable adhesive, or by any other means. It can thus be seen that unit 10, exclusive of the pistons consists only of two parts, namely, the cylinder 12 and end cap 24.

Piston head 20 is mounted on the end 30 of piston rod 17. A plurality of bores 31 are formed in piston head 20. A retainer 32 is mounted on reduced end portion 33 of head 20 by means of an interference fit and it retains annular valve member 34 in position so that it can move either to the right or to the left. When it has moved to the left, it will abut the end 35 of head 20 and when it moves fully to the right, it will rest against flange 36. When piston head 20 moves to the right, valve 34 will cover bores 31 so that the full shock resistant effect of the piston head entering cylinder 12 will be obtained, with piston head 20 providing dampening. When the force moving piston rod 17 into cylinder 11 is removed, piston rod 17 will move to the left because of the tendency of the compressed fluid to expand and because of the tendency of the stretched plastic cylinder to return to its initial preload diameter, and under these conditions valve 34 will move to the position shown in FIG. 1 to permit fluid to pass from chamber 23 into chamber 34.

At this point it is to be noted that by maintaining a quantity of fluid in chamber 23, the force-stroke curve 39 is obtained because the existence of fluid in chamber 23 as piston rod 17 moves to the right will prevent evacuation of chamber 23 before the flow of fluid from chamber 24 occurs to avoid either creating a vacuum in chamber 23 or gasifying the fluid. This secondary chamber 23 is essential for a 95% efficient shock curve. If chamber 23 were not in existence, the curve which would be obtained would be that shown as curve 40 wherein a high initial shock force is experienced, the shock force being the difference between the pressures on opposite sides of piston head 20. The spring curve of unit 10 is shown at line 41 and it is a combination of compressing the fluid 4% in unit 10 and stretching the nylon cylinder 11 approximately 5% of the total volume of liquid. It is noted that unit 10 is fabricated either of nylon or a plastic known under the trademark DELRIN or DELRIN AF. At this point it is also to be noted that the central portion 12 of cylinder 11 should be sufficiently rigid so as to avoid excessive expansion but the seal portion 15–16 should be sufficiently flexible so as to provide proper sealing. The dimensions shown on the drawing are proper to obtain the foregoing relationship, when it is considered that the outer diameter of cylinder 11 is intended in practice to be 1" and the dimensions of all the remainder of the parts are proportional thereto. The foregoing dimensions are solely by way of example.

In FIG. 6 a modified cylinder 11' is shown which may be identical in all respects to cylinder 11 of FIG. 1 but which includes a chamber 42 in communication with chamber 23. By providing annular chamber 42, a circular hinge line is provided approximately at 43 to permit end wall 13 to pivot outwardly away from chamber 23 and inwardly toward rod 17 to thereby cause all portions of bore 14 of the seal to engage piston rod 17 more tightly. By this expedient, good sealing is enhanced.

In FIG. 7 a further modified form of end cap structure is shown which comprises a cap portion 44 having threads 45 thereon for mating engagement with threads 46 on cylinder 11A. A piston 47, which is separate from cap 44 includes an O-ring 49 in annular groove 50. During assembly, piston 47 is forced into cylinder 11A to compress the fluid therein, to thereby preload it. Except for the foregoing described structure, the remainder of cylinder 11A may be identical to all parts shown in FIG. 1. A rod may also be inserted through bore 49 to move piston 47 to the left to compress the fluid and cap 44 may thereafter be threaded down by light finger pressure to retain the fluid in the desired state of compressibility.

In FIG. 8 a still further modified form is shown wherein cylinder 11B includes an annular rim 52 which is received in a mating annular slot 53 of end cap 54 which also mounts a piston 55 therein for compressing the fluid within cylinder 11B as cap 54 is installed by moving it onto rim 52. The foregoing construction lends itself particularly well to ultrasonic sealing after the assembly has been completed. All other portions of the embodiment of FIG. 8 may be identical to the structure shown in FIG. 1.

In FIG. 9 a still further embodiment is shown wherein cylinder 11C includes a rim portion 56 which is received within annular rim portion 57 of end cap 58. Annular grooves 59 are formed in portion 57 and annular grooves 60 are formed in rim 56. Suitable cement 61 is placed between rim 56 and annular portion 57 before assembly, and this cement hardens after assembly. While this embodiment does not show a piston, such as shown in all the preceding embodiments for compressing the fluid, it will be appreciated that such a piston can be provided, if desired.

It is to be especially noted that all parts of the cylinder are fabricated from plastic and that the fabrication of the cylinder 11 itself is effected primarily by a molding process, with either hot forming of bore 14 by a subsequent operation or subsequent machining of only the critical portions, such as the opening 14 adjacent the piston rod seal. Because of this fabrication technique, the liquid spring 10 can be fabricated at an unusually low cost.

It is also to be especially noted that the thermal coefficient of expansion of the cylinder 11 matches the thermal coefficient of expansion of the fluid 24 so therefore the liquid spring will provide uniform operation regardless of the temperature to which it is subjected. In this respect, it will work equally well in cold environments or hot environments, and it will work equally well both when it is operating cool and when it is heated up due to the internal friction of the fluid.

In addition to the foregoing, the plastic of cylinder 11 is ten times more elastic than steel, and the expansion of the cylinder wall is further put to work to obtain a square shock wave. In this respect, the piston 20 is preferably mounted within central housing portion 12 with an interference fit and when the unit 10 is subjected to a shock force, there is a constant expansion of the housing at the same speed longitudinally of the housing as the speed of the piston head through the housing to cause uniform fluid flow resistance force to give a square shock wave without a fluidic head such as in U.S. Pat. Nos. 3,722,640, 3,726,368 and 3,698,521.

By way of example, in a unit such as shown in FIG. 1 wherein the outer diameter is 1" and the other dimensions of all the parts are proportional, the interference fit between the piston head 20 and the inner wall of the cylinder is 0.002 inches. Furthermore, the amount of initial interference fit between piston rod 17 and opening 14 is 0.005 inches.

In FIGS. 10 and 11 a further modification of the present invention is disclosed. In this modification a plastic cylinder 70 is threaded at 71 throughout its length. A cap 72 is fixedly attached in any suitable manner to one end of cylinder 70 and a piston 73 extends through bore 74 in end wall 75. The end wall includes an integral seal 76 which terminates at lip portion 77 as described in detail above relative to FIG. 1. The sides of cylinder 70 have flats 78 and 79 formed on opposite sides thereof so that the cylinder can be held by a wrench for threading into a machine part 80 having a tapped bore 81 therein.

The end walls of cylinder 70, being relatively massive, will not expand when the compressible fluid 82 has its pressure increased due to the action of piston 73. Furthermore, machine part 80 will effectively restrict cylinder 70 from expanding outwardly. However, the tendency for cylinder wall 70 to expand eliminates the need for a lock nut to be used to hold cylinder 70 in position.

In the embodiment of FIGS. 10 and 11, the annular shoulder 83 is upset by heat and deformed to provide a retaining ring 84 for the purpose of holding an annular cylindrical foam accumulator section 85 in the chamber 86 to provide the displacement which is necessary during compression of fluid 82 because such displacement cannot be obtained by the expansion of cylinder 70 which is restricted from moving outwardly by machine part 80, as noted above.

In practice, the unit of FIG. 10 is intended to cushion impacts of a conveyor or an assembly operation, and the primary restoring force is the elasticity of the cylinder walls outside of machine part 80. However, to prevent excessive internal pressure, the foam accumulator 85 absorbs part of the displacement at the maximum stroke.

While preferred embodiments of the present invention have been described, it will be appreciated that the present invention is not limited thereto, but may be otherwise embodied within the scope of the following claims.

What is claimed is:

1. A liquid shock-absorber device comprising a plastic cylinder having first and second ends, an end wall molded integrally with said cylinder at said first end of said cylinder, a piston rod having a central portion and a first end within said cylinder and a second end externally of said cylinder, a plastic seal including a flexible annular lip molded integrally with said end wall, said flexible annular lip extending inwardly into said cylinder and in combination with said first end wall defining an opening for receiving said central portion of said piston rod in sealing relationship, a chamber proximate said end wall at said first end of said cylinder surrounding said flexible annular lip, closure means closing said second end of said cylinder, and fluid in said chamber 2. A liquid shock-absorber device as set forth in claim 1 wherein said closure means comprises a cap, and compression means for pressurizing said fluid.

3. A liquid shock-absorber device as set forth in claim 2 wherein said compression means comprises piston means operatively associated with said cap.

4. A liquid shock-absorber device as set forth in claim 3 wherein said piston means is separate from said cap, a bore in said cap for permitting access to said piston means to move said piston means to a predetermined position, and means for adjusting the position of said cap to retain said piston means in said predetermined position.

5. A liquid shock-absorber device as set forth in claim 1 including a piston head on said first end of said piston rod, shoulder means formed integrally with said cylinder and spaced from said end wall and facing said second end of said cylinder, a second chamber between said shoulder means and said closure means, pressurized fluid in said second chamber, and means on said piston head for engaging said shoulder means for preventing said piston head from occupying said chamber.

6. A liquid shock-absorber device as set forth in claim 5 wherein said closure means comprises a cap, and compression means for pressurizing said fluid.

7. A liquid shock-absorber device as set forth in claim 6 wherein said compression means comprises piston means operatively associated with said cap.

8. A liquid shock-absorber device as set forth in claim 5 wherein said fluid is compressible and wherein said cylinder includes a threaded portion on the outside thereof for fitting into a threaded aperture, a compressible foam member in said chamber, and means for retaining said foam member in said chamber.

9. A liquid shock-absorber device as set forth in claim 1 including means for causing said end wall to be effectively hinged relative to said cylinder to thereby permit said annular lip to swing with said end wall into sealing engagement with said central portion of said piston rod as a result of the force exerted by pressurized fluid in said chamber.

10. A liquid shock-absorber device as set forth in claim 9 wherein said closure means comprises a cap, and compression means for pressurizing said fluid.

11. A liquid shock-absorber device as set forth in claim 9 wherein said compression means comprises piston means operatively associated with said cap.

12. A fluid shock-absorber device as set forth in claim 9 wherein said chamber includes a second chamber surrounding said central portion of said piston rod, and a third chamber in communication with said second chamber and extending radially outwardly from said second chamber in contiguous relationship with said end wall.

13. A liquid shock-absorber device as set forth in claim 1 wherein said cylinder is of a strength wherein it will yield when said shock-absorber device is subjected to a shock force.

14. A liquid shock-absorber device as set forth in claim 13 wherein said piston head is of a size so that it provides an interference fit with said cylinder.

15. A liquid shock-absorber device as set forth in claim 14 wherein said yielding of said cylinder and said interference fit are of a magnitude which will cause constant expansion of said cylinder longitudinally thereof at substantially the same speed as said piston head to cause uniform fluid flow resistance force to produce a substantially square shock wave.

16. A liquid shock-absorber device as set forth in claim 1 wherein the thermal coefficient of expansion of said fluid matches the thermal coefficient of expansion of said cylinder to provide uniform operation regardless of the temperature to which said cylinder and fluid are subjected.

* * * * *